US012587877B2

(12) United States Patent
Zhang et al.

(10) Patent No.: US 12,587,877 B2
(45) Date of Patent: Mar. 24, 2026

(54) METHOD AND APPARATUS FOR DETERMINING A POOR NETWORK QUALITY AREA

(71) Applicant: Telefonaktiebolaget LM Ericsson (publ), Stockholm (SE)

(72) Inventors: Fengpei Zhang, Guangzhou (CN); Baiping Chen, Guangzhou (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 384 days.

(21) Appl. No.: 18/025,419

(22) PCT Filed: Sep. 14, 2020

(86) PCT No.: PCT/CN2020/115098
§ 371 (c)(1),
(2) Date: Mar. 9, 2023

(87) PCT Pub. No.: WO2022/052110
PCT Pub. Date: Mar. 17, 2022

(65) Prior Publication Data
US 2024/0031842 A1    Jan. 25, 2024

(51) Int. Cl.
*H04W 24/08* (2009.01)
*H04W 4/024* (2018.01)
*H04W 24/10* (2009.01)
(52) U.S. Cl.
CPC ........... *H04W 24/08* (2013.01); *H04W 4/024* (2018.02); *H04W 24/10* (2013.01)

(58) Field of Classification Search
None
See application file for complete search history.

(56) References Cited

U.S. PATENT DOCUMENTS

| | | | |
|---|---|---|---|
| 9,961,584 B2 * | 5/2018 | Alisawi | ............ H04W 52/0254 |
| 11,310,731 B1 * | 4/2022 | Feder | ...................... H04W 8/08 |
| 2014/0257695 A1 * | 9/2014 | Annapureddy | .. G08G 1/096811 |
| | | | 701/537 |
| 2014/0288820 A1 | 9/2014 | Opshaug et al. | |

(Continued)

FOREIGN PATENT DOCUMENTS

| | | |
|---|---|---|
| CN | 107846659 A | 3/2018 |
| CN | 110381468 A | 10/2019 |

(Continued)

OTHER PUBLICATIONS

Author Unknown, "C-V2X Use Cases Methodology, Examples and Service Level Requirements," White Paper, 2019, Munich, Germany, 5GAA, 77 pages.

(Continued)

*Primary Examiner* — Otis L Thompson, Jr.
(74) *Attorney, Agent, or Firm* — Withrow & Terranova, PLLC

(57) ABSTRACT

Embodiments of the present disclosure provide methods and apparatuses for determining a poor network quality area. A method performed by a server comprises determining at least one poor network quality area based on network status data from at least one of at least one terminal device, a network device, or an application server. The method further comprises sending information regarding the at least one poor network quality area to a terminal device.

19 Claims, 14 Drawing Sheets

200

202

Determining at least one poor network quality area based on network status data from at least one of at least one terminal device, a network device, or an application server

204

Sending information regarding the at least one poor network quality area to a terminal device

(56) References Cited

U.S. PATENT DOCUMENTS

| | | | | |
|---|---|---|---|---|
| 2015/0120087 | A1 | 4/2015 | Duan et al. | |
| 2016/0323156 | A1* | 11/2016 | Zakaria | H04B 17/318 |
| 2017/0106786 | A1* | 4/2017 | Ebina | G08B 5/36 |
| 2018/0203455 | A1* | 7/2018 | Cronin | G05D 1/0217 |
| 2019/0045336 | A1* | 2/2019 | Chang | H04W 4/40 |
| 2020/0008044 | A1* | 1/2020 | Poornachandran | |
| | | | | H04L 41/5019 |
| 2020/0164860 | A1* | 5/2020 | Morita | B60K 6/365 |
| 2020/0241106 | A1* | 7/2020 | Shu | G01S 5/0252 |
| 2021/0243106 | A1* | 8/2021 | Costa-Requena | |
| | | | | H04L 12/4633 |
| 2021/0282053 | A1* | 9/2021 | Xin | H04W 28/24 |
| 2022/0167262 | A1* | 5/2022 | Ding | H04L 67/56 |
| 2023/0062362 | A1* | 3/2023 | Sun | H04W 36/00 |

FOREIGN PATENT DOCUMENTS

| | | | |
|---|---|---|---|
| CN | 111071263 | A | 4/2020 |
| EP | 3177063 | A1 | 6/2017 |
| WO | 2017045139 | A1 | 3/2017 |
| WO | 2020172491 | A1 | 8/2020 |

OTHER PUBLICATIONS

Author Unknown, "Technical Specification Group Services and System Aspects; Architecture enhancements for 5G System (5GS) to support network data analytics services (Release 16)," Technical Specification 23.288, Version 16.4.0, Jul. 2020, 3GPP Organizational Partners, 66 pages.

Author Unknown, "Technical Specification Group Services and System Aspects; System architecture for the 5G System (5GS); Stage 2 (Release 16)," Technical Specification 23.501, Version 16.5.1, Aug. 2020, 3GPP Organizational Partners, 440 pages.

Author Unknown, "Technical Specification Group Services and System Aspects; Architecture enhancements to facilitate communications with packet data networks and applications (Release 15)," Technical Specification 23.682, Version 15.4.0, Mar. 2018, 3GPP Organizational Partners, 124 pages.

Author Unknown, "Technical Specification Group Services and System Aspects; Architecture enhancements to facilitate communications with packet data networks and applications (Release 16)," Technical Specification 23.682, Version 16.7.0, Jul. 2020, 3GPP Organizational Partners, 134 pages.

Author Unknown, "Technical Specification Group Core Network and Terminals; T8 reference point for Northbound APIs (Release 15)," Technical Specification 29.122, Version 2.0.0, Jun. 2018, 3GPP Organizational Partners, 255 pages.

Huawei, et al., "S6-181589: Proposal for Network situation and QoS monitoring and reporting," 3GPP TSG-SA WG6 Meeting #26, Oct. 15-19, 2018, Vilnius, Lithuania, 8 pages.

International Search Report and Written Opinion for International Patent Application No. PCT/CN2020/115098, mailed Jun. 10, 2021, 9 pages.

Author Unknown, "Technical Specification Group Services and System Aspects; Study on enhancements to application layer support for V2X services; (Release 17)," Technical Report 23.764, Version 2.0.0, Sep. 2020, 3GPP Organizational Partners, 62 pages.

Author Unknown, "Technical Specification Group Services and System Aspects; Study of Enablers for Network Automation for 5G (Release 16)," Technical Report 23.791, Version 16.2.0, Jun. 2019, 3GPP Organizational Partners, 124 pages.

LG Electronics, et al., "S2-1901807: New solution for KI#15," 3GPP SA WG2 Meeting #131, Feb. 25-Mar. 1, 2019, Santa Cruz, Spain, 12 pages.

Extended European Search Report for European Patent Application No. 20952898.3, mailed May 16, 2024, 10 pages.

* cited by examiner

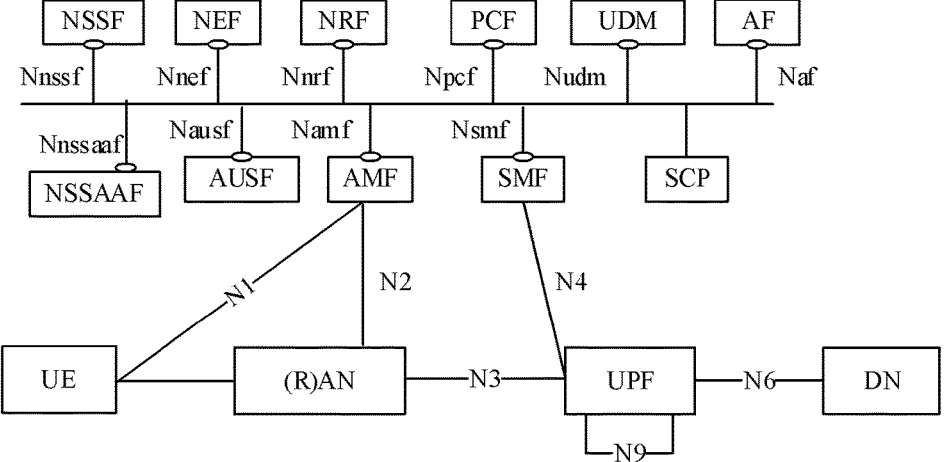

IP-SM-GW

SMS-SC/
GMSC/
IWMSC

Tsms

SME

E

SGd

Gd

CDF/
CGF

HSS

MTC
AAA

S6n

Rf/Ga

S6m

Control plane ●●●●●
User plane ———
API — · —

MTC-IWF

Tsp

S6t

SCEF

T8

Services
Capability
Server
(SCS)

Application
Server
(AS)

1

Gi/SGi

T6a

GGSN/
P-GW

Application
Server
(AS)

2

T6b

Gi/SGi

Application

UE

RAN

MSC

SGs

MME

SGSN

Indirect Model  1

Direct Model  2

Hybrid Model  1  +  2

S-GW

Um/
Uu/
LTE-Uu

FIG. 1a

NSSF    NEF    NRF    PCF    UDM    AF

Nnssf    Nnef    Nnrf    Npcf    Nudm    Naf

Nnssaaf    Nausf    Namf    Nsmf

NSSAAF    AUSF    AMF    SMF    SCP

N1    N2    N4

UE    (R)AN    —N3—    UPF    —N6—    DN

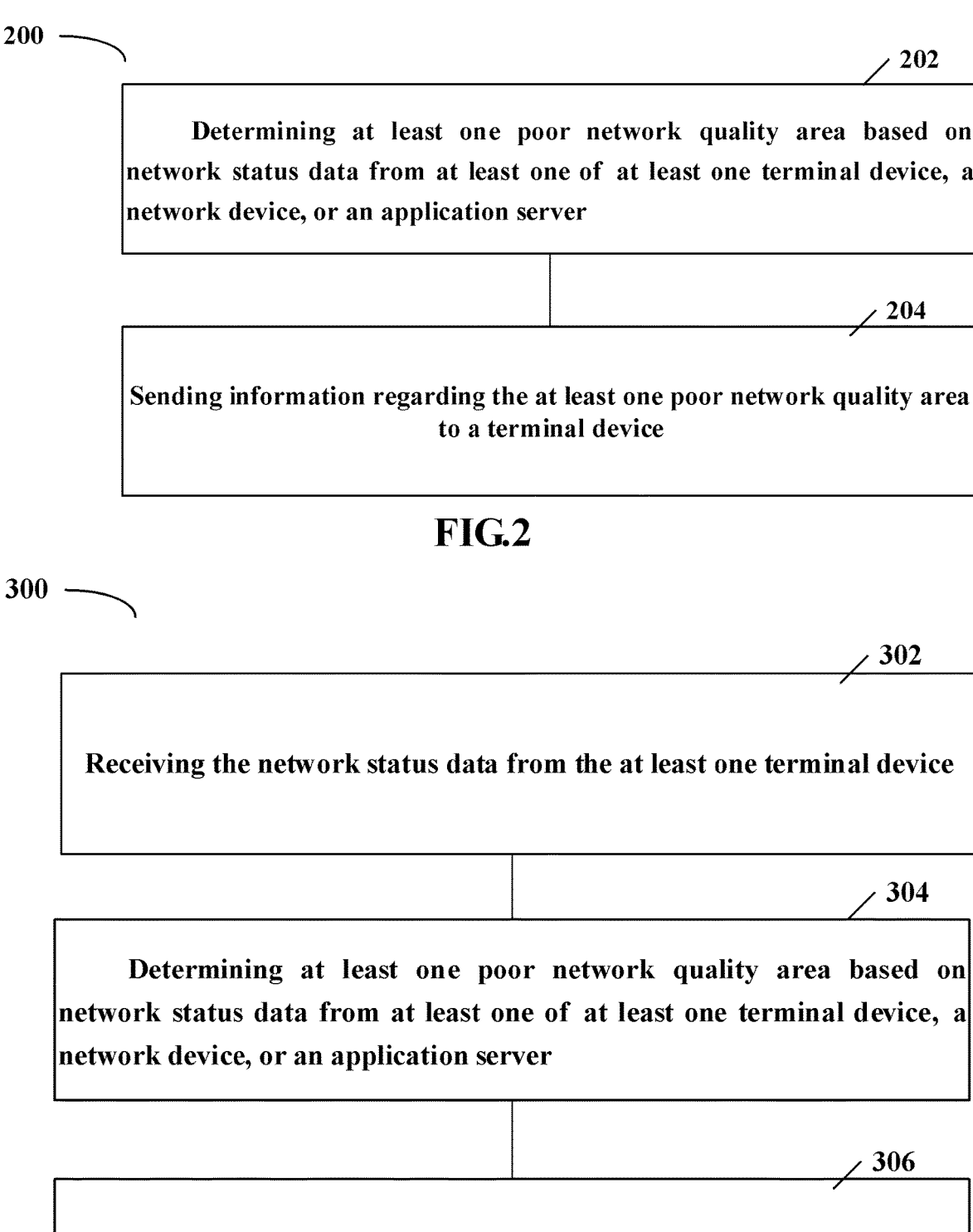

200

202

Determining at least one poor network quality area based on network status data from at least one of at least one terminal device, a network device, or an application server

204

Sending information regarding the at least one poor network quality area to a terminal device

Receiving the network status data from the at least one terminal device

304

Determining at least one poor network quality area based on network status data from at least one of at least one terminal device, a network device, or an application server

306

Sending information regarding the at least one poor network quality area to a terminal device

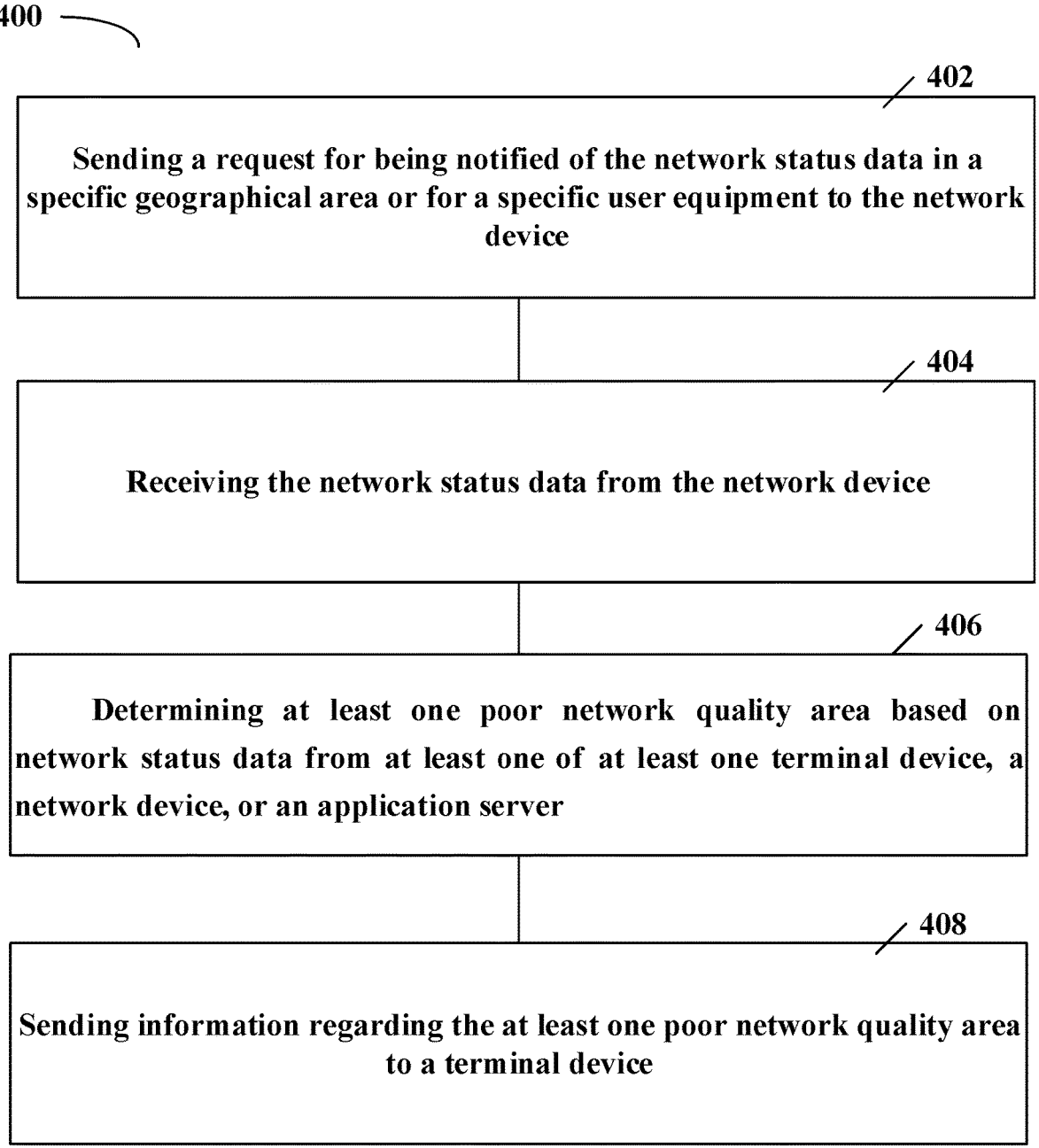

402

Sending a request for being notified of the network status data in a specific geographical area or for a specific user equipment to the network device

404

Receiving the network status data from the network device

406

Determining at least one poor network quality area based on network status data from at least one of at least one terminal device, a network device, or an application server

408

Sending information regarding the at least one poor network quality area to a terminal device

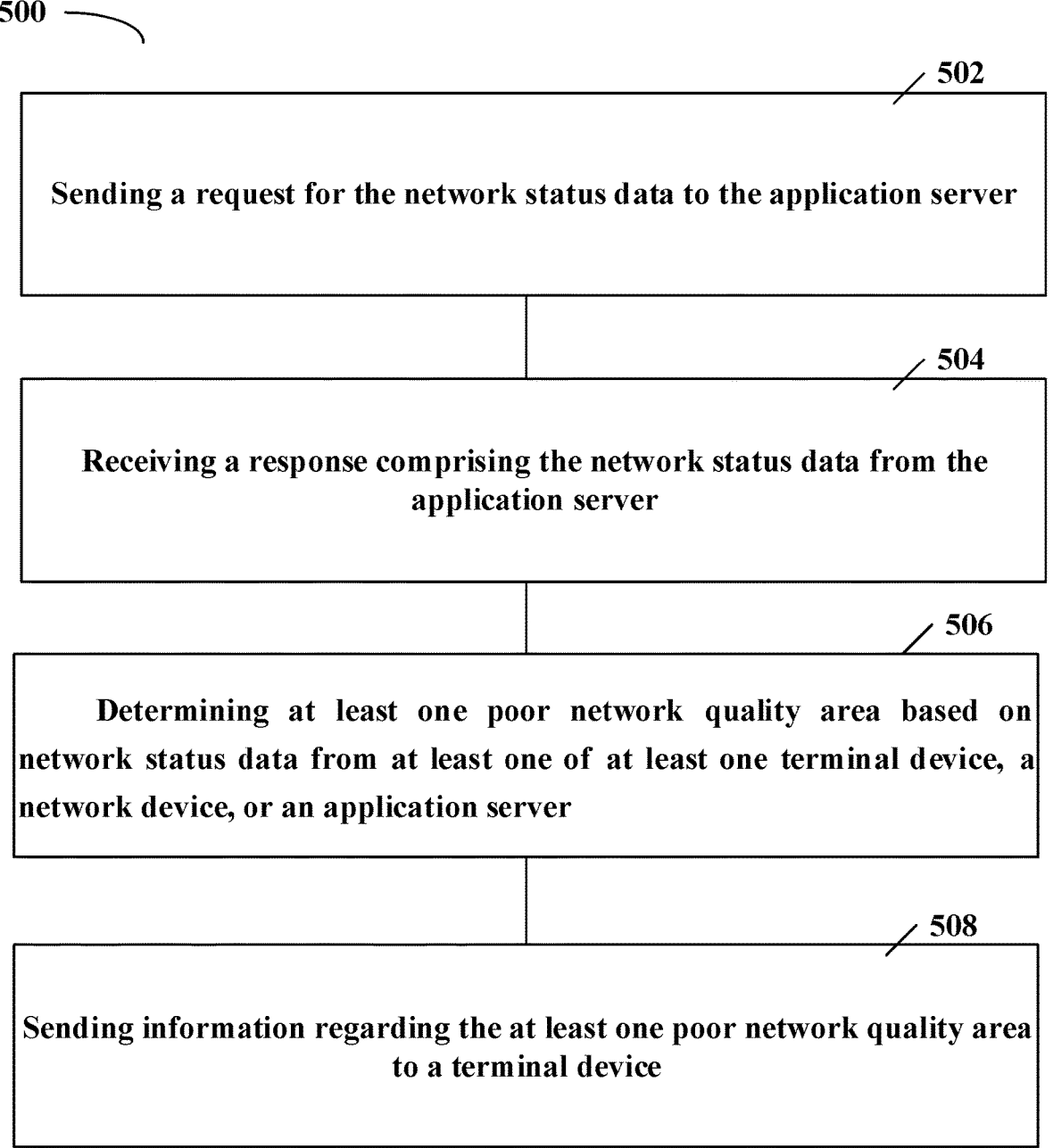

502

Sending a request for the network status data to the application server

504

Receiving a response comprising the network status data from the application server

506

Determining at least one poor network quality area based on network status data from at least one of at least one terminal device, a network device, or an application server

508

Sending information regarding the at least one poor network quality area to a terminal device

FIG.5

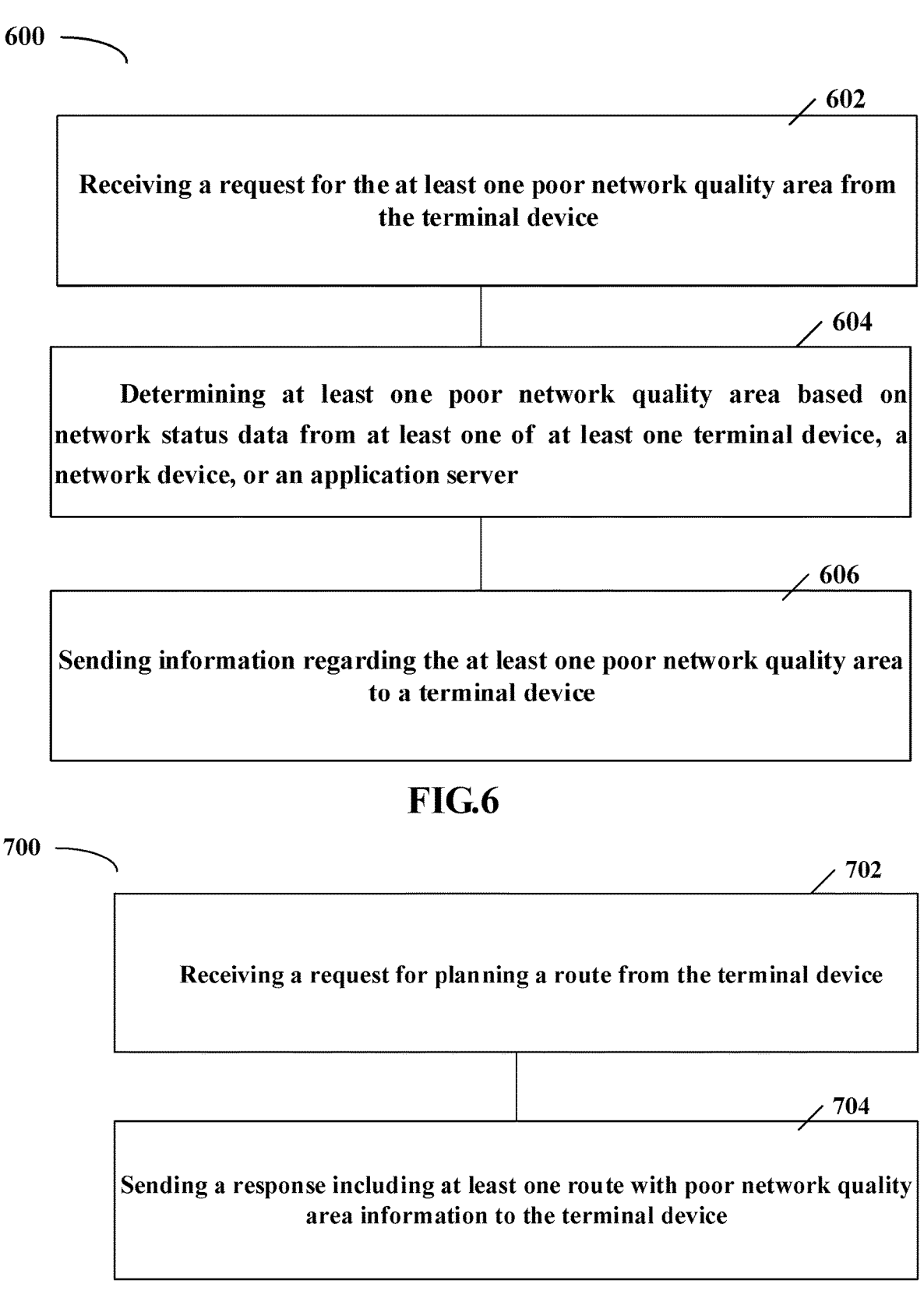

600

602

Receiving a request for the at least one poor network quality area from the terminal device

604

Determining at least one poor network quality area based on network status data from at least one of at least one terminal device, a network device, or an application server

606

Sending information regarding the at least one poor network quality area to a terminal device

Receiving a request for planning a route from the terminal device

704

Sending a response including at least one route with poor network quality area information to the terminal device

FIG.7

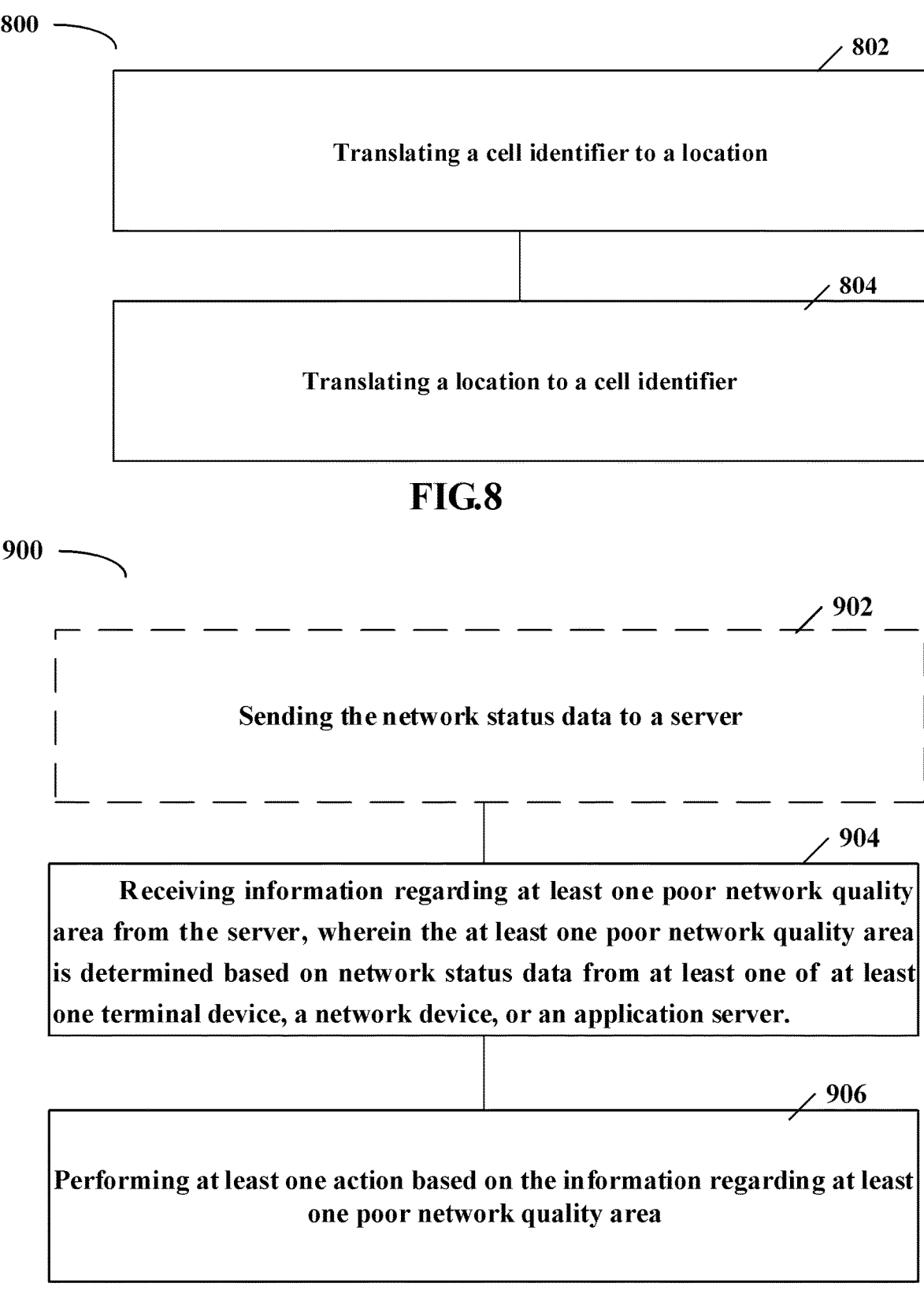

800

802

Translating a cell identifier to a location

804

Translating a location to a cell identifier

Sending the network status data to a server

904

Receiving information regarding at least one poor network quality area from the server, wherein the at least one poor network quality area is determined based on network status data from at least one of at least one terminal device, a network device, or an application server.

906

Performing at least one action based on the information regarding at least one poor network quality area

FIG.9

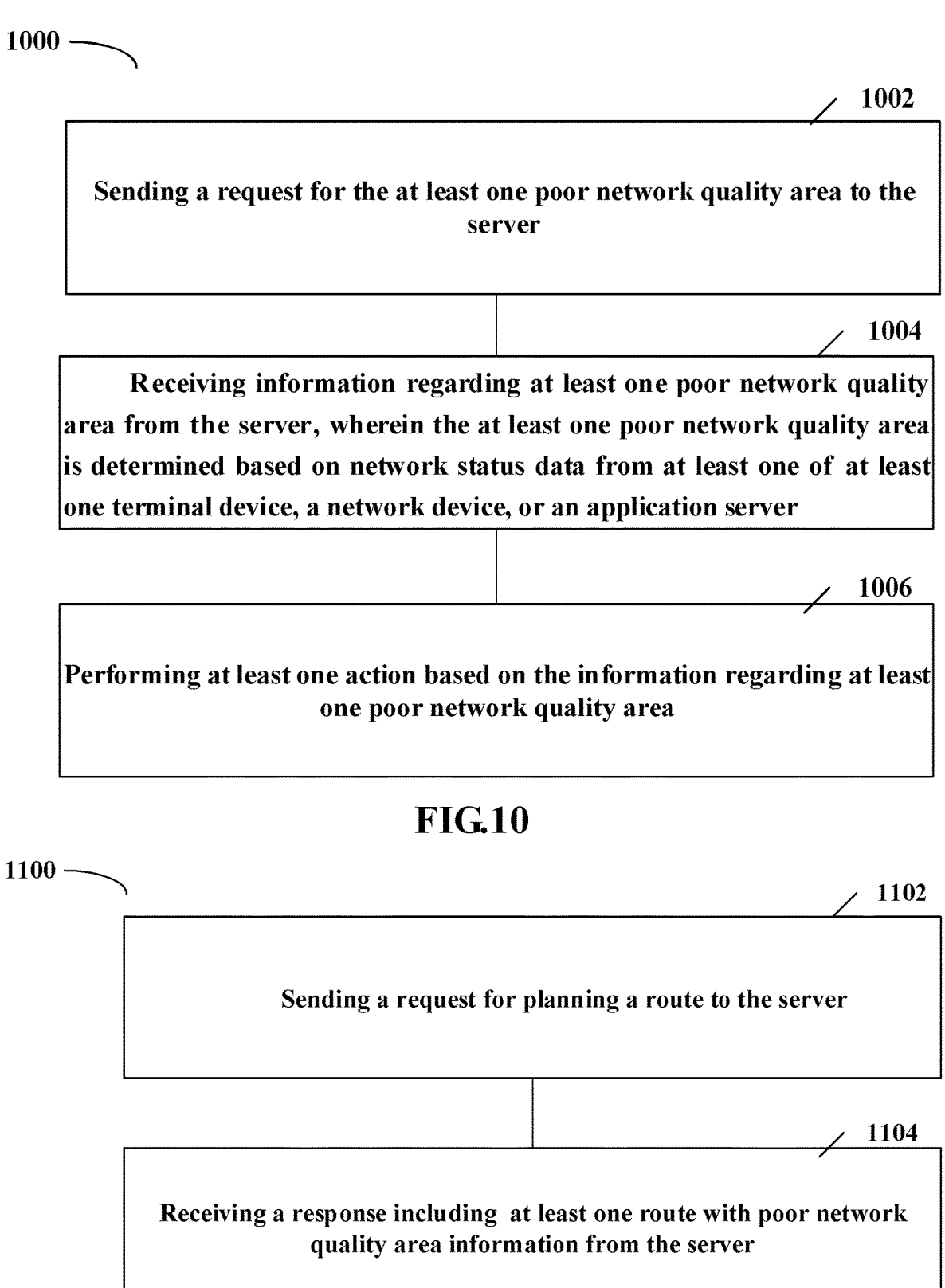

1000

1002

Sending a request for the at least one poor network quality area to the server

1004

Receiving information regarding at least one poor network quality area from the server, wherein the at least one poor network quality area is determined based on network status data from at least one of at least one terminal device, a network device, or an application server

1006

Performing at least one action based on the information regarding at least one poor network quality area

Sending a request for planning a route to the server

1104

Receiving a response including at least one route with poor network quality area information from the server

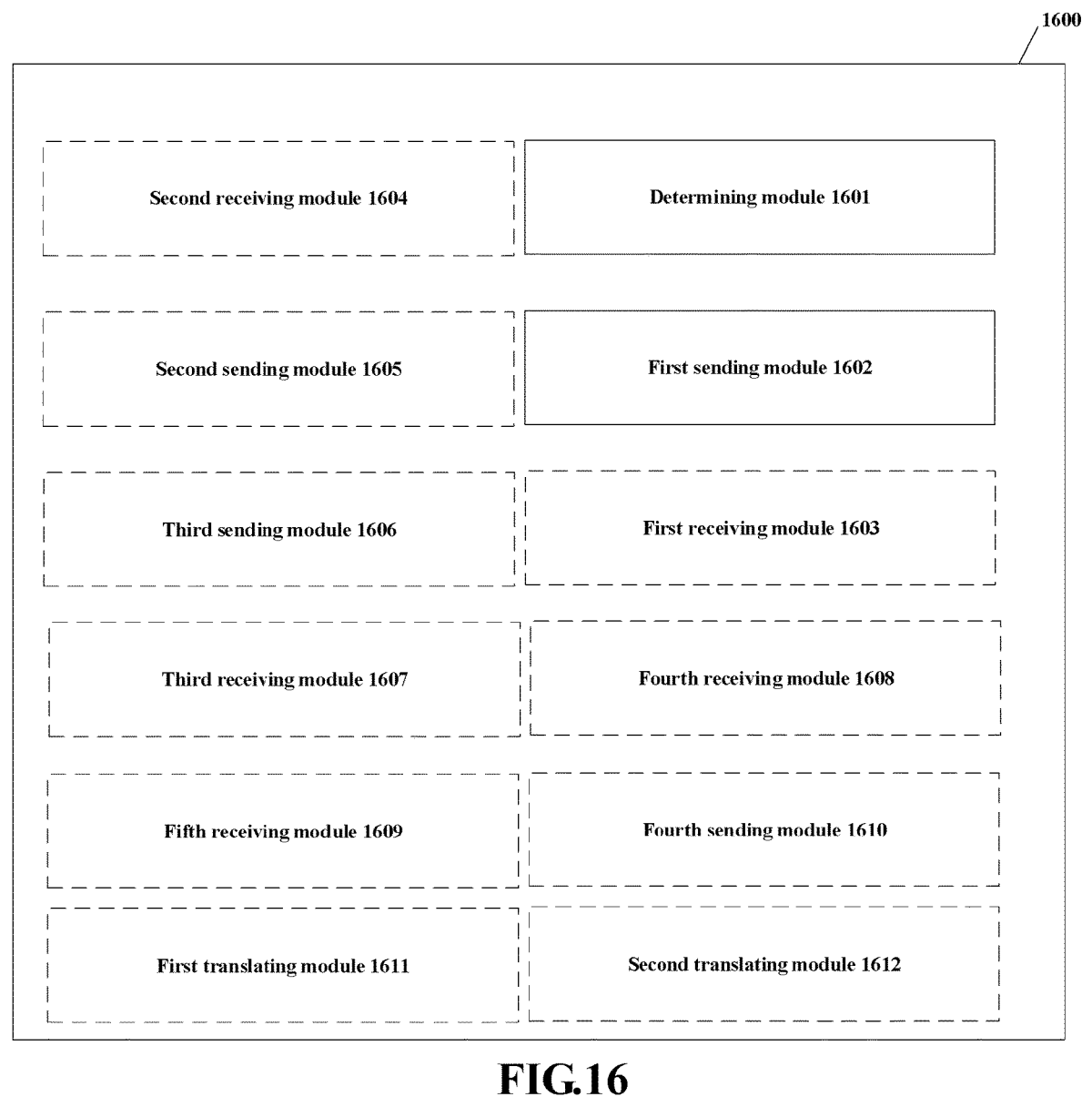

| | |
|---|---|
| Second receiving module 1604 | Determining module 1601 |
| Second sending module 1605 | First sending module 1602 |
| Third sending module 1606 | First receiving module 1603 |
| Third receiving module 1607 | Fourth receiving module 1608 |
| Fifth receiving module 1609 | Fourth sending module 1610 |
| First translating module 1611 | Second translating module 1612 |

FIG.16

METHOD AND APPARATUS FOR DETERMINING A POOR NETWORK QUALITY AREA

This application is a 35 U.S.C. § 371 national phase filing of International Application No. PCT/CN2020/115098, filed Sep. 14, 2020, the disclosure of which is incorporated herein by reference in its entirety.

TECHNICAL FIELD

The non-limiting and exemplary embodiments of the present disclosure generally relate to the technical field of communications, and specifically to methods and apparatuses for determining a poor network quality area.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE)/fourth generation (4G) network and new radio (NR)/fifth generation (5G) network are expected to achieve high traffic capacity and end-user data rate with lower latency. To meet the diverse requirements of new services across a wide variety of industries, the 3rd generation partnership project (3GPP) is developing various network function services for various communication networks.

V2X (Vehicle-to-Everything) is a technology that allows vehicles to communicate with any entity that may affect the vehicles, and vice versa. V2X may include some specific types of communication such as V2I (vehicle-to-infrastructure), V2N (vehicle-to-network), V2V (vehicle-to-vehicle), V2P (vehicle-to-pedestrian), etc.

C-V2X (cellular V2X) is a V2X communication technology which may use a network (such as 4G LTE or 5G NR) to enable a vehicle to exchange information with any entity such as another vehicle, a vehicle server, an application server, a network device, a pedestrian, a fixed object such as traffic lights.

C-V2X may enable a wide range of services such as a road transport service, a left turn assist service, an intersection movement assist service, an emergency electric brake lights service, a queue warning service, a speed harmonization service, a real time situational awareness service, a software update service, a remote vehicle health monitoring service, a real-time high definition maps service, a high definition sensor sharing service, a see-through service, a vulnerable road user discovery service, etc.

For example, the left turn assist service may enable an alert to be given to drivers as they attempt an unprotected left turn across traffic, to help them avoid crashes with opposite direction traffic. The intersection movement assist service may inform a driver when it is not safe to enter an intersection, for example, when something is blocking the driver's view of opposing or crossing traffic. The emergency electronic brake lights service may enable a driver to be alerted to hard braking in a traffic stream ahead. The emergency electronic brake lights service may provide the driver with additional time to look for, and assess situations developing ahead. The queue warning service may provide messages and information to a driver in order to minimize a likelihood of a potential crash. For example, queue warnings may be transmitted to a vehicle in order to minimize or prevent rear-end or other secondary collisions. The speed harmonization service may provide a driver with speed recommendations which may be determined based on traffic conditions and weather information. The real time situational awareness service may provide mechanisms for vehicles to receive real time information about city/roadway projects, lane closures, traffic, and other conditions that may necessitate adjustments to driving patterns. The software updates service may provide mechanisms for vehicles to receive the latest software updates and security credentials required to ensure their safe operation. The remote vehicle health monitoring service may provide mechanisms to diagnose vehicle issues remotely. As driving becomes automatic, the remote vehicle health monitoring service may be used for remote supervision of vehicle functions and its health. The real-time high definition maps service may provide situational awareness for automatic vehicles at critical road segments in the case of changing road conditions (e.g. new traffic cone detected by another vehicle some time ago). The high definition sensor sharing service may provide mechanisms for vehicles to share high definition sensor data to enable better driving coordination for platoon and intersection management. The see-through service may provide an ability for vehicles such as trucks, minivans, cars in platoons to share camera images of road conditions ahead of them to vehicles behind them. The vulnerable road user discovery service may provide an ability to identify potential safety conditions due to the presence of vulnerable road users such as pedestrians or cyclists.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are some problems in C-V2X. A problem is how to determine a poor network quality area. For example, C-V2X may rely on a cellular network to provide various services, such as various safety services for guaranteeing safety of vehicles and pedestrians, advanced driving assistance services, etc. However, the cellular network may not provide a required quality in some locations due to various reasons, such as a network coverage reason, a signal strength reason, a network congestion reason and a network overloading (such as edge application server overloading) reason, etc. Therefore it may be desirable for a device in C-V2X to determine or predict a poor network quality area and then notify at least one vehicle to get prepared for various services, such as safety related services.

There may be some solutions for determining a poor network quality area. For example, a vehicle may report poor or weak network information with location information to a C-V2X server or platform. However, this solution may only rely on the vehicle to determine the poor network quality area and may have some drawbacks. For example, an individual vehicle may need to implement an algorithm or a logic to identify the poor network quality area, but the individual vehicle may not have enough data to identify the poor network quality area. Moreover this solution may be lack of the network quality data that can be obtained from the cellular network. For example, the cellular network can provide a lot of information about the network quality, such as radio congestion information, load information, network latency information, etc. By leveraging the information provided by the cellular network, the vehicle platform or server may know about a cause of poor network quality from a perspective of the cellular network and then may provide some solutions to avoid or mitigate an impact of poor network quality on C-V2X services. In addition, this solution may be lack of the network quality data that can be obtained from an application server. For example, the application server can provide a lot of information about the network quality, such as network latency information, packet loss ratio information, load information, etc. By leveraging the information provided by the application server, the vehicle platform or server may also know a cause for poor network quality from a perspective of the application server and then may provide some solutions to avoid or mitigate an impact of the poor network quality on C-V2X services.

To overcome or mitigate at least one of the above mentioned problems or other problems, the embodiments of the present disclosure propose an improved solution for determining a poor network quality area.

In a first aspect of the disclosure, there is provided a method performed by a server. The method comprises determining at least one poor network quality area based on network status data from at least one of at least one terminal device, a network device, or an application server. The method further comprises sending information regarding the at least one poor network quality area to a terminal device.

In an embodiment, the method may further comprise receiving the network status data from the at least one terminal device.

In an embodiment, the network status data from the at least one terminal device may comprise received signal strength data, location data, cell identifier data and time data.

In an embodiment, the method may further comprise receiving the network status data from the network device.

In an embodiment, the network status data from the network device may comprise congestion status data, cell identifier data, time data and network slice data.

In an embodiment, the method may further comprise sending a request for being notified of the network status data in a specific geographical area or for a specific user equipment to the network device.

In an embodiment, the method may further comprise sending a request for the network status data to the application server. The method may further comprise receiving a response comprising the network status data from the application server.

In an embodiment, the network status data from the application server may comprise latency data, cell identifier data, network slice data and time data.

In an embodiment, the method may further comprise receiving a request for the at least one poor network quality area from the terminal device.

In an embodiment, the request for the at least one poor network quality area may comprise location data, time data, latency requirement data, and network slice data.

In an embodiment, when the network status data in a network area does not fulfill a network quality requirement, the network area may be determined as a poor network quality area.

In an embodiment, the method may further comprise receiving a request for planning a route from the terminal device. The method may further comprise sending a response including at least one route with poor network quality area information to the terminal device.

In an embodiment, the method may further comprise translating a cell identifier to a location. The method may further comprise translating a location to a cell identifier.

In an embodiment, the terminal device may comprise at least one of a vehicle; a drone; a mobile phone; a ship; a boat; a plane; a helicopter; a bike; or a motorcycle.

In an embodiment, the network device may be a service capability exposure function, SCEF, or a network exposure function, NEF, or a combined SCEF and NEF or a network data analytics function, NWDAF.

In an embodiment, the application server may be an edge application server.

In an embodiment, the server may be a vehicle server.

In an embodiment, the at least one poor network quality area may be related to the terminal device.

In a second aspect of the disclosure, there is provided a method performed by a terminal device. The method comprises receiving information regarding at least one poor network quality area from a server. The method further comprises performing at least one action based on the information regarding at least one poor network quality area. The at least one poor network quality area is determined based on network status data from at least one of at least one terminal device, a network device, or an application server.

In an embodiment, the method may further comprise sending the network status data to the server.

In an embodiment, the method may further comprise sending a request for the at least one poor network quality area to the server.

In an embodiment, the method may further comprise sending a request for planning a route to the server. The method may further comprise receiving a response including at least one route with poor network quality area information from the server.

In an embodiment, using the information regarding at least one poor network quality area may comprise at least one of planning a route to bypass a poor network quality area; reminding a driver of a poor network quality area; or switching an automatic driving mode to a manual driving mode before the terminal device enters into a poor network quality area.

In a third aspect of the disclosure, there is provided a server. The server comprises a processor; and a memory coupled to the processor, said memory containing instructions executable by said processor, whereby said server is operative to determine at least one poor network quality area based on network status data from at least one of at least one terminal device, a network device, or an application server. Said server is further operative to send information regarding the at least one poor network quality area to a terminal device.

In a fourth aspect of the disclosure, there is provided a terminal device. The terminal device comprises a processor; and a memory coupled to the processor, said memory containing instructions executable by said processor, whereby said terminal device is operative to receive information regarding at least one poor network quality area from a server. Said terminal device is further operative to perform at least one action based on the information regarding at least one poor network quality area. The at least one poor network quality area is determined based on network status data from at least one of at least one terminal device, a network device, or an application server.

In a fifth aspect of the disclosure, there is provided a computer program product, comprising instructions which, when executed on at least one processor, cause the at least one processor to carry out any of the methods according to the first and second aspects of the disclosure.

In a sixth aspect of the disclosure, there is provided a computer-readable storage medium storing instructions which when executed by at least one processor, cause the at least one processor to carry out any of the methods according to the first and second aspects of the disclosure.

Various embodiments herein offer various advantages, of which a non-exhaustive list of examples follows. In some embodiments herein, the proposed solution may determine at least one poor network quality area based on network status data from at least one data source. In some embodiments herein, the proposed solution may be used by various services for which the determined poor network quality area may be critical. In some embodiments herein, the proposed solution may improve a driving safety in V2X. In some embodiments herein, the proposed solution may collect data (including the network status) from multiple data sources, so that a determination accuracy of poor network quality area can be improved. In some embodiments herein, the proposed solution may use various network status data (such as network slice's network status data and edge application server's network status data) to determine at least one poor network quality area. In some embodiments herein, the proposed solution may be a server-side dominated solution that may reduce a complexity of a terminal side such as vehicle side.

BRIEF DESCRIPTION OF THE DRAWINGS

The above and other aspects, features, and benefits of various embodiments of the present disclosure will become more apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 1a schematically shows a system architecture in a 4G network;

FIG. 1b schematically shows a system architecture in a 5G network;

FIG. 2 shows a flowchart of a method according to an embodiment of the present disclosure;

FIG. 3 shows a flowchart of a method according to another embodiment of the present disclosure;

FIG. 4 shows a flowchart of a method according to another embodiment of the present disclosure;

FIG. 5 shows a flowchart of a method according to another embodiment of the present disclosure;

FIG. 6 shows a flowchart of a method according to another embodiment of the present disclosure;

FIG. 7 shows a flowchart of a method according to another embodiment of the present disclosure;

FIG. 8 shows a flowchart of a method according to another embodiment of the present disclosure;

FIG. 9 shows a flowchart of a method according to another embodiment of the present disclosure;

FIG. 10 shows a flowchart of a method according to another embodiment of the present disclosure;

FIG. 11 shows a flowchart of a method according to another embodiment of the present disclosure;

FIG. 16 is a block diagram showing a server according to an embodiment of the disclosure.

DETAILED DESCRIPTION

Figure 1C:
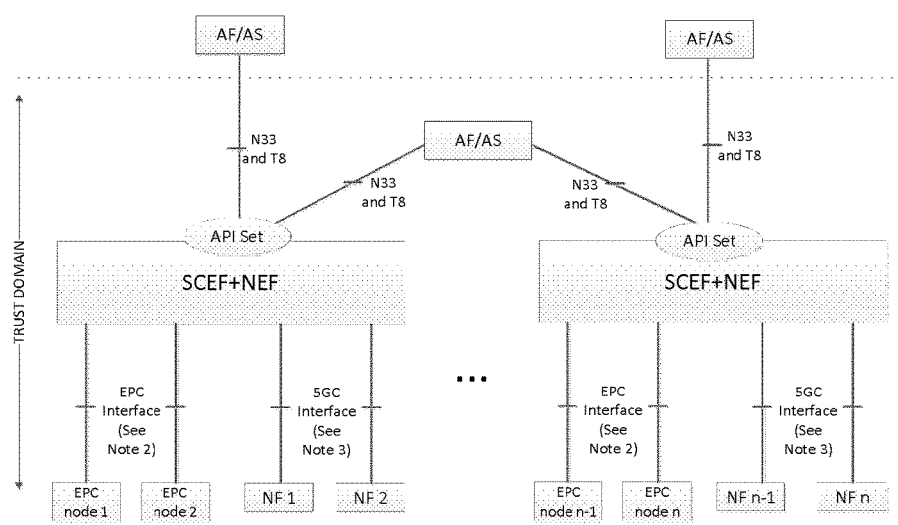
FIG. 1c schematically shows a system architecture for service exposure for EPC-5GC interworking.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP). For example, the wireless communication protocols may comprise the first generation (1G), 2G, 3G, 4G, 4.5G, 5G communication protocols, and/or any other protocols either currently known or to be developed in the future.

The term "entity" used herein refers to a network device or a network node or a network function in a communication network. For example, in a wireless communication network such as a 3GPP-type cellular network, a core network device may offer numerous services to customers who are interconnected by an access network device. Each access network device is connectable to the core network device over a wired or wireless connection.

The term "network function" refers to any suitable function which can be implemented in a network entity (physical or virtual) of a communication network. For example, a network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SA/IF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), etc. For example, the 4G system (such as LTE) may include MME (Mobile Management Entity), HSS (home subscriber server), SCEF (service capability exposure function), etc. In other embodiments, the network function may comprise different types of NFs for example depending on a specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB (Universal Serial Bus) dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrases "at least one of A or B" and "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to the cellular network as defined by 3GPP being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies such as wireless sensor network may equally be utilized as long as exemplary embodiments described herein are applicable.

FIGS. 1a-1d show some system architectures in which the embodiments of the present disclosure can be implemented. For simplicity, the system architectures of FIGS. 1a-1d only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1a schematically shows a system architecture in a 4G network, which is the same as FIG. 4.2-1a of 3GPP TS 23.682 V16.7.0, the disclosure of which is incorporated by reference herein in its entirety. The system architecture of FIG. 1a may comprise some exemplary elements such as Services Capability Server (SCS), Application Server (AS), SCEF, HSS, UE, RAN(Radio Access Network), SGSN (Serving GPRS (General Packet Radio Service) Support Node), MME, MSC (Mobile Switching Centre), S-GW (Serving Gateway), GGSN/P-GW (Gateway GPRS Support Node/PDN (Packet Data Network) Gateway), MTC-IWF (Machine Type Communications-InterWorking Function) CDF/CGF (Charging Data Function/Charging Gateway Function), MTC-AAA (Machine Type Communications-authentication, authorization and accounting), SMS-SC/GMSCAWMSC(Short Message Service-Service Centre/Gateway MSC/InterWorking MSC) IP-SM-GW (Internet protocol Short Message Gateway). The network elements and interfaces as shown in FIG. 1a may be same as the corresponding network elements and interfaces as described in 3GPP TS 23.682 V16.7.0.

FIG. 1b schematically shows a system architecture in a 5G network, which is the same as FIG. 4.2.3-1 of 3GPP TS 23.501 V16.5.1, the disclosure of which is incorporated by reference herein in its entirety. The system architecture of FIG. 1b may comprise some exemplary elements such as AMF, SMF, AUSF, UDM, PCF, AF, NEF, UPF and NRF, (R)AN, SCP, NSSF (Network Slice Selection Function), NSSAAF (Network Slice-Specific Authentication and Authorization Function), etc. The network elements, reference points and interfaces as shown in FIG. 1B may be same as the corresponding network elements, reference points and interfaces as described in 3GPP TS 23.501 V16.5.1.

FIG. 1c schematically shows a system architecture for service exposure for EPC (evolved packet core)-5GC (5G core network) interworking, which is the same as FIG. 4.3.5.1 1 of 3GPP TS 23.501 V16.5.1. For example, if a UE is capable of mobility between EPS (evolved packet system) and 5GS (5G system), the network (such as EPC or 5GC) is expected to associate the UE with a combined SCEF and NEF (also called an SCEF+NEF node) for service capability exposure. The system architecture of FIG. 1c may comprise some exemplary elements such as AF/AS, SCEF+NEF, EPC node, NF, etc. The network elements and interfaces as shown in FIG. 1c may be same as the corresponding network elements and interfaces as described in 3GPP TS 23.501 V16.5.1.

The exposure function entity such as SCEF, NEF or SCEF+NEF may provide a means to securely expose services and capabilities provided by various network interfaces. The exposure function entity may provide a means for a discovery of the exposed services and capabilities. The exposure function entity may provide an access to network capabilities through network application programming interfaces (e.g. Network APIs (Application Programming Interfaces)). The exposure function entity may abstract the services from underlying network interfaces and protocols.

For example, the exposure function entity such as SCEF, NEF or SCEF+NEF may support analytics reporting capability such as network status reporting capability. The analytics reporting capability may be for allowing an external party (such as a server) to fetch or subscribe/unsubscribe to analytics information generated by the network such as LTE or NR. The details for the analytics reporting capability as well as interactions between the exposure function entity, an AF (such as the server) and the NWDAF are described in 3GPP TS 23.288 V16.4.0.

Figure 1D:
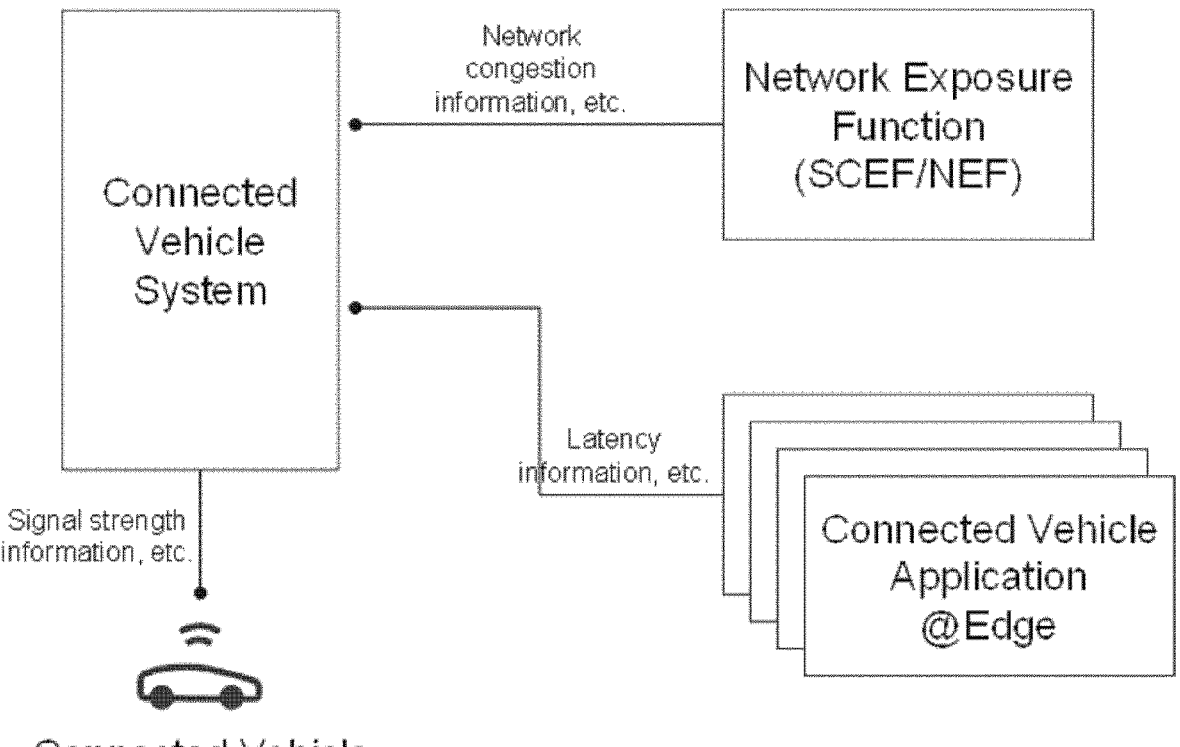
FIG. 1d depicts a schematic system, in which some embodiments of the present disclosure can be implemented.

FIG. 1d depicts a schematic system, in which some embodiments of the present disclosure can be implemented.

The system may comprise a connected vehicle with a network connectivity that can communicate with any other device or system. The connected vehicle may send various information such as telemetry data, an event, etc. to a connected vehicle system, and receive various information such as commands, notifications, etc. from the connected vehicle system. Though only one connected vehicle is shown in FIG. 1d, there may any other suitable number of vehicles in other embodiments. In addition, the connected vehicle may be replaced with any other suitable terminal device.

The system may further comprise the connected vehicle system. The connected vehicle system may be a centric system that may provide a set of services to at least one connected vehicles. For example, the services may be a telematics service, an infotainment service, a geofencing service, a remote diagnostic service, etc. The connected vehicle may communicate with the connected vehicle system through a network such as LTE or NR in order to access at least one service of the connected vehicle system.

The system may further comprise one or more connected vehicle application servers which may be deployed at an edge of a network. The applications deployed at the edge of the network may provide latency-sensitive services to the connected vehicle. The connected vehicle may communicate with an edge connected vehicle application through the network such as LTE or NR in order to access at least one service of the edge connected vehicle application.

The system may further comprise a network exposure function such as SCEF or NEF or SCEF+NEF. The network exposure function may provide a means to securely expose at least one service and at least one capability provided by a 3GPP network. For example, one of the capabilities/APIs (Application Programming Interfaces) that the network exposure function can provide is the capability of reporting of network status. By using the capability of reporting of network status, the connected vehicle system can get network congestion events from the network exposure function.

FIG. 2 shows a flowchart of a method 200 according to an embodiment of the present disclosure, which may be performed by an apparatus implemented in or at or as a server or communicatively coupled to the server. As such, the apparatus may provide means or modules for performing various operations of the method 200 as well as means or modules for performing other operations in conjunction with other components. The server may be any suitable server. In an embodiment, the server may be a vehicle server such as the connected vehicle system as shown in FIG. 1d.

At block 202, the server may determine at least one poor network quality area based on network status data from at least one of at least one terminal device, a network device, or an application server. The poor network quality area may be of any suitable size and/or shape. For example, the poor network quality area may be of a regular shape. The poor network quality area may be of an irregular shape. The poor network quality area may be represented in various ways. For example, the poor network quality area may be represented by using coordinate information.

The network status data may be received from any suitable device which can provide the network status data to the server. For example, the network status data from the at least one terminal device may be received from a network management device which may receive the network status data from the at least one terminal device. The network status data from the network device may be received from any suitable network device such as SCEF, NEF, SCEF+NEF or NWDAF.

The network status data may comprise any suitable network status data. For example, the network status data may comprise at least one of end to end latency data, received signal strength data, cell identifier data, time data, network slice data, packet loss rate data, load status data, location data, etc. The end to end latency data may be collected by a terminal device or a server (e.g., application server) serving the terminal device. The end to end latency data may be one way delay or round trip delay. The received signal strength data may be collected by a receiver such as a terminal device. The cell identifier data may be collected by a terminal device. The cell identifier data may be used to indicate a specific cell where the network status data is collected. The time data may be used to indicate a time when the network status data is collected. For example, the time data may be a timestamp. The network slice data may comprise a network slice identifier (such as S-NSSAI (Single Network Slice Selection Assistance Information)) and network status data related to the network slice, such as slice load level information, etc. The packet loss rate data may be collected by a receiver such as a terminal device or a server. The load status data may be various load data such as network load or terminal device load or network function load or application server load, etc. The location data may be coordinate information or other suitable location information.

The server may determine the at least one poor network quality area based on the network status data in various ways. For example, each type of network status data may be set with a corresponding poor network quality condition. When the network status data fulfils its corresponding poor network quality condition, a corresponding area related to the network status data may be determined as a poor network quality area. For example, if an average end to end latency between a terminal device and an application server (such as an edge application server) is lower than a latency requirement, a corresponding area in which the terminal device is located may be determined as a poor network quality area. If the received signal strength of a terminal device is lower than a signal strength threshold, a corresponding area in which the terminal device is located may be determined as a poor network quality area. If the network congestion status data indicates that a probability of the network congestion is high, then a corresponding area in which the terminal device is located may be determined as a poor network quality area. If the network slice data indicates that a load of the network slice is high, then a corresponding area in which the terminal device using the network slice is located may be determined as a poor network quality area.

In an embodiment, the server may determine the at least one poor network quality area based on two or more types of network status data. For example, when each of the two or more types of network status data fulfils its corresponding poor network quality condition, a corresponding area related to the two or more types of network status data may be determined as a poor network quality area.

Each type of network status data may be configured with a corresponding network quality requirement. In an embodiment, when the network status data in a network area does not fulfill a corresponding network quality requirement, the network area may be determined as a poor network quality area. The network quality requirement may be preconfigured in the server. Alternatively, the network quality requirement may be provided by the terminal device. Different types of terminal devices may provide different network quality requirements. Different types of service may require different network qualities.

The terminal device may be any suitable device which can use a network (such as LTE or NR) to communicate with another device such as the server. In an embodiment, the terminal device may comprise at least one of a vehicle; a drone; a mobile phone; a ship; a boat; a plane; a helicopter; a bike; or a motorcycle.

The network device may be any suitable network device which can provide the network status data to the server. In an embodiment, the network device may be an exposure function entity or an NWDAF. The exposure function entity may be any suitable network function which can securely expose services and capabilities provided by various network interfaces. In an embodiment, the exposure function entity may be a SCEF or a NEF, or a combined SCEF and NEF.

The application server may be any suitable server which can provide at least one service to the terminal device. The application server may be deployed in any suitable location. In an embodiment, the application server may be an edge application server which may be deployed at an edge of the network.

In an embodiment, the at least one poor network quality area may be related to the terminal device. For example, the server may determine the at least one poor network quality area in a specific geographical region, a specific route, a specific road, a specific sea area, a specific water area, a specific airspace, etc. and store the at least one poor network quality area in a storage. When the terminal device may provide one or more locations that it is about to enter or pass or when the server is required to plan a route for the terminal device, the server may determine the at least one poor network quality area related to the terminal device by comparing of the locations or the route and the at least one poor network quality area stored in the storage and finding the at least one poor network quality area related to the terminal device.

At block 204, the server may send information regarding the at least one poor network quality area to a terminal device. The information regarding the at least one poor network quality area may be sent to the terminal device in various ways, such as in response to a request for fetching the poor network quality area from the terminal device, in response to a request for subscribing the poor network quality area from the terminal device, etc. The server may also push the information regarding the at least one poor network quality area to the terminal device for example when the information regarding the at least one poor network quality area is changed or when the information regarding the at least one poor network quality area is pushed to the terminal device for the first time.

FIG. 3 shows a flowchart of a method 300 according to another embodiment of the present disclosure, which may be performed by an apparatus implemented in or at or as a server or communicatively coupled to the server. For some parts which have been described in the above embodiments, detailed description thereof is omitted here for brevity.

At block 302, the server may receive the network status data from the at least one terminal device. For example, the server may send a request for obtaining the network status data to a terminal device, and then the terminal device may collect the network status data according to the request. The terminal device may immediately or periodically send the network status data to the server. Alternatively, the terminal device may actively collect the network status data and send it to the server.

In an embodiment, the network status data from the at least one terminal device may comprise received signal strength data, location data, cell identifier data and time data. For example, the received signal strength data may be a received signal strength indication. The location data may be a location in which the network status data is collected by the terminal device. The cell identifier data may be an identifier of a cell where the terminal device is located. The time data may be a timestamp indicating a time when the network status data is collected. In other embodiments, the network status data from the at least one terminal device may comprise any other suitable network status data which can be used for determining the at least one poor network quality area.

Blocks 304 and 306 are same as blocks 202 and 204 of FIG. 2.

FIG. 4 shows a flowchart of a method 400 according to another embodiment of the present disclosure, which may be performed by an apparatus implemented in or at or as a server or communicatively coupled to the server. For some parts which have been described in the above embodiments, detailed description thereof is omitted here for brevity.

At block 402, the server may send a request for being notified of the network status data in a specific geographical area or for a specific user equipment to the network device. The network device may be the exposure function entity or NWDAF. The request may be an analytics subscribe request or an analytics request.

In an embodiment, the server may request to be informed, one-time, of the network status. The server may request to be informed, continuously, about the network status. For example, the procedures as described in clauses 6.1.1.1, 6.1.1.2, 6.1.2.1 or 6.1.2.2 in 3GPP TS 23.288 V16.4.0 may be used by the server to retrieve Network Status Result (NSR) from the network for a specific geographic area or for a specific UE.

In an embodiment, the request may be Nnef_Analytics-Exposure_Subscribe as described in clause 6.1.1.2 in 3GPP TS 23.288 V16.4.0. In another embodiment, the request may be Nnef_AnalyticsExposure_Fetch as described in clause 6.1.2.2 in 3GPP TS 23.288 V16.4.0. After receiving the request for network status notification from the server, the exposure function entity may retrieve user data congestion analytics information from NWDAF, as defined in 3GPP TS 23.288 V16.4.0.

In an embodiment, the server may be an NWDAF service consumer. The request may be Nnwdaf_AnalyticsSubscription_Subscribe as described in clause 6.1.1.1 in 3GPP TS 23.288 V16.4.0. In another embodiment, the request may be Nnwdaf_AnalyticsInfo_Request as described in clause 6.1.2.1 in 3GPP TS 23.288 V16.4.0.

At block 404, the server may receive the network status data from the network device such as the exposure function entity or NWDAF.

In an embodiment, the network status data may be included in Nnef_AnalyticsExposure_Notify as described in clause 6.1.1.2 in 3GPP TS 23.288 V16.4.0. In another embodiment, the network status data may be included in Nnef_AnalyticsExposure_Fetch response as described in clause 6.1.2.2 in 3GPP TS 23.288 V16.4.0.

In an embodiment, if the server is an NWDAF service consumer, the network status data may be included in Nnwdaf_AnalyticsSubscription_Notify as described in clause 6.1.1.1 in 3GPP TS 23.288 V16.4.0. In another embodiment, the network status data may be included in Nnwdaf_AnalyticsInfo_Request response as described in clause 6.1.2.2 in 3GPP TS 23.288 V16.4.0.

Based on the user data congestion analytics information that the exposure function entity such as NEF receives from the NWDAF, the exposure function entity such as NEF derives and reports the network status for the geographical area or for the UE as Network Status Result (NSR) to the sever. When reporting to the server, the NSR may not include any 3GPP location information.

Either exact values for congestion status, as reported by NWDAF to the exposure function entity or abstracted values e.g. (High, Medium, Low) can be reported by the exposure function entity to the server.

When the server requests one-time Network Status from the exposure function entity such as NEF, the exposure function entity can optionally provide a time interval at which the AF is allowed to re-issue the same request for network status.

The time interval provided by the exposure function entity can be ignored by the server if a subsequent request on network status is considerably different with regards to the geographical area or the UE.

In an embodiment, the network status data from the exposure function entity comprises congestion status data, cell identifier data, time data and network slice data.

Blocks 406 and 408 are same as blocks 202 and 204 of FIG. 2.

FIG. 5 shows a flowchart of a method 500 according to another embodiment of the present disclosure, which may be performed by an apparatus implemented in or at or as a server or communicatively coupled to the server. For some parts which have been described in the above embodiments, detailed description thereof is omitted here for brevity.

At block 502, the server may send a request for the network status data to the application server. The request may be sent periodically or on demand.

At block 504, the server may receive a response comprising the network status data from the application server.

In an embodiment, the network status data from the application server may comprise latency data, cell identifier data, network slice data and time data.

Blocks 506 and 508 are same as blocks 202 and 204 of FIG. 2.

FIG. 6 shows a flowchart of a method 600 according to another embodiment of the present disclosure, which may be performed by an apparatus implemented in or at or as a server or communicatively coupled to the server. For some parts which have been described in the above embodiments, detailed description thereof is omitted here for brevity.

At block 602, the server may receive a request for the at least one poor network quality area from the terminal device. The request may include any suitable parameter. For example, the terminal device may send a request for obtaining the poor network quality areas in a specific geographical area. The request may include at least one poor network quality condition parameter which can be used by the server to determine the at least one poor network quality area.

In an embodiment, the request for the at least one poor network quality area may comprise location data, time data, latency requirement data, and network slice data. For example, in the request, the terminal device may provide a list of locations, a list of estimated times when the terminal device may arrive at a corresponding location, a latency requirement parameter, a network slice parameter, etc.

Blocks 604 and 606 are same as blocks 202 and 204 of FIG. 2.

In this embodiment, the information regarding the at least one poor network quality area may be sent to the terminal device in response to the request for the at least one poor network quality area from the terminal device.

FIG. 7 shows a flowchart of a method 700 according to another embodiment of the present disclosure, which may be performed by an apparatus implemented in or at or as a server or communicatively coupled to the server. For some parts which have been described in the above embodiments, detailed description thereof is omitted here for brevity.

At block 702, the server may receive a request for planning a route from the terminal device. The request may include any suitable parameters which can be used by the server to plan the route. For example, the request may include a start location, an end location, speed information of the terminal device, an intermediate location that the terminal device must pass, etc. Alternatively, the request may include at least one network quality requirement.

At block 704, the server may send a response including at least one route with poor network quality area information to the terminal device. For example, the at least one route may be marked with poor network quality area information. For example, the server may plane at least one route based on the request and then mark the poor network quality area information on the at least one route based on the network quality area information that is determined by the server. For example, a first route does not pass any poor network quality area, a second route passes only one poor network quality area, a third route pass two poor network quality areas, etc.

FIG. 8 shows a flowchart of a method 800 according to another embodiment of the present disclosure, which may be performed by an apparatus implemented in or at or as a server or communicatively coupled to the server. For some parts which have been described in the above embodiments, detailed description thereof is omitted here for brevity.

At block 802, the server may translate a cell identifier to a location.

At block 804, the server may translate a location to a cell identifier.

For example, the server may implement the translation function by using location services as defined in 3GPP TS 23.273 V16.4.0, the disclosure of which is incorporated by reference herein in its entirety.

FIG. 9 shows a flowchart of a method 900 according to another embodiment of the present disclosure, which may be performed by an apparatus implemented in or at or as a terminal device or communicatively coupled to the terminal device. As such, the apparatus may provide means or modules for performing various operations of the method 900 as well as means or modules for performing other operations in conjunction with other components. For some parts which have been described in the above embodiments, detailed description thereof is omitted here for brevity.

At block 902, optionally, the terminal device may send network status data to a server. The network status data from the terminal device may comprise received signal strength data, location data, cell identifier data and time data.

At block 904, the terminal device may receive information regarding at least one poor network quality area from the server. For example, the server may send this information at block 204 of FIG. 2, and then the terminal device may receive this information.

In an embodiment, the at least one poor network quality area may be determined based on network status data from at least one of at least one terminal device, a network device, or an application server. The at least one terminal device may include the terminal device performing the method 900 or any other terminal device(s) or their combination.

At block 906, the terminal device may perform at least one action based on the information regarding at least one poor network quality area. The at least one action may be any suitable action(s), such as various actions related to C-V2X services. For example, the terminal device may use the information to plan a route. The terminal device may store the information, The terminal device may provide the information to a user of the terminal device before the terminal device enters into the at least one poor network quality area. The terminal device may share the information to another terminal device. The terminal device may control the use of network resources of the terminal device based on the information.

In an embodiment, performing at least one action based on the information regarding at least one poor network quality area may comprise at least one of planning a route to bypass a poor network quality area; reminding a driver of a poor network quality area; or switching an automatic driving mode to a manual driving mode before the terminal device enters into a poor network quality area.

FIG. 10 shows a flowchart of a method 1000 according to another embodiment of the present disclosure, which may be performed by an apparatus implemented in or at or as a terminal device or communicatively coupled to the terminal device. For some parts which have been described in the above embodiments, detailed description thereof is omitted here for brevity.

At block 1002, the terminal device may send a request for the at least one poor network quality area to the server.

In an embodiment, the request for the at least one poor network quality area may comprise location data, time data, latency requirement data, and network slice data.

Blocks 1004 and 1006 are same of blocks 904 and 906 of FIG. 9.

FIG. 11 shows a flowchart of a method 1100 according to another embodiment of the present disclosure, which may be performed by an apparatus implemented in or at or as a terminal device or communicatively coupled to the terminal device. For some parts which have been described in the above embodiments, detailed description thereof is omitted here for brevity.

At block 1102, the terminal device may send a request for planning a route to the server.

At block 1104, the terminal device may receive a response includes at least one route with poor network quality area information from the server.

Figure 12:
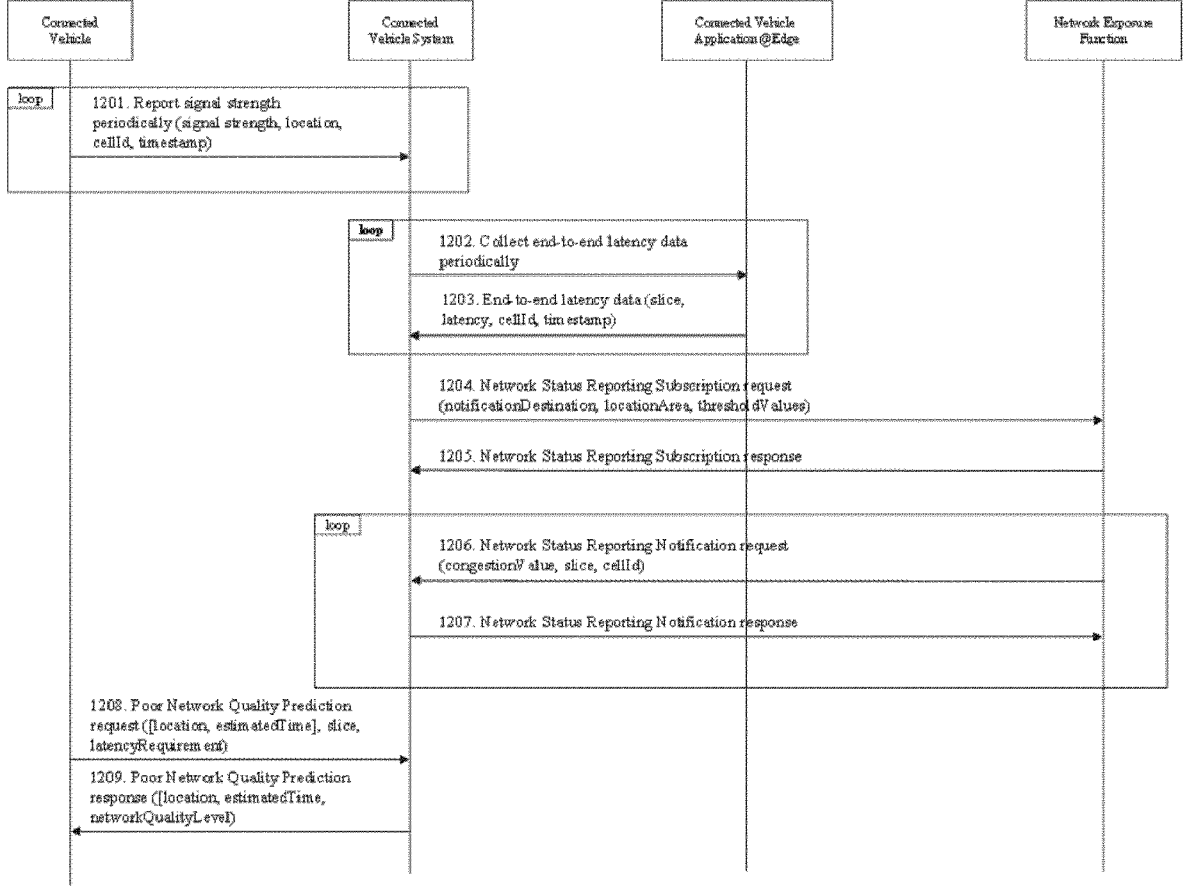
FIG. 12 shows a flowchart of a method according to another embodiment of the present disclosure.

FIG. 12 shows a flowchart of a method according to another embodiment of the present disclosure.

At step 1201, a connected vehicle may periodically report radio signal strength data (together with a corresponding location and a cell identifier (cellId)) to a connected vehicle system.

At step 1202, the connected vehicle system may periodically collect log data of end-to-end round trip latency from at least one connected vehicle application which may be deployed at an edge of a network.

At step 1203, the at least one connected vehicle application may return the log data to the connected vehicle system. The log data may include various data, such as network slice information, latency data, cellId and timestamp. For example, the cellId may be obtained from the connected vehicle when it communicates with the at least one connected vehicle application.

At step 1204, the connected vehicle system may send a network status reporting subscription request to a network exposure function to subscribe network congestion events.

At step 1205, the network exposure function may send a network status reporting subscription response to the connected vehicle system.

At step 1206, when the network exposure function detects a network congestion event, the network exposure function may send a network status reporting notification request to the connected vehicle system. The request may include various data, such as a congestion value, cellId, network slice information, etc.

At step 1207, the connected vehicle system may send a network status reporting notification response to the network exposure function.

The above steps 1201-1207 are for a data collection phase. After collecting the needed data, the connected vehicle system may apply a data analytics technology to train a prediction model that may be used for poor network quality area prediction.

At step 1208, the connected vehicle may send a poor network quality prediction request to request the connected vehicle system to predict at least one poor network quality area. In the request, the connected vehicle may provide at least one parameter such as a list of locations, an estimated time that the connected vehicle will arrive at a corresponding location, a latency requirement, network slice information, etc.

At step 1209, the connected vehicle system may send a poor network quality prediction response including poor network quality area information such as a list of locations that have been predicted as the poor network quality areas.

Figure 13:
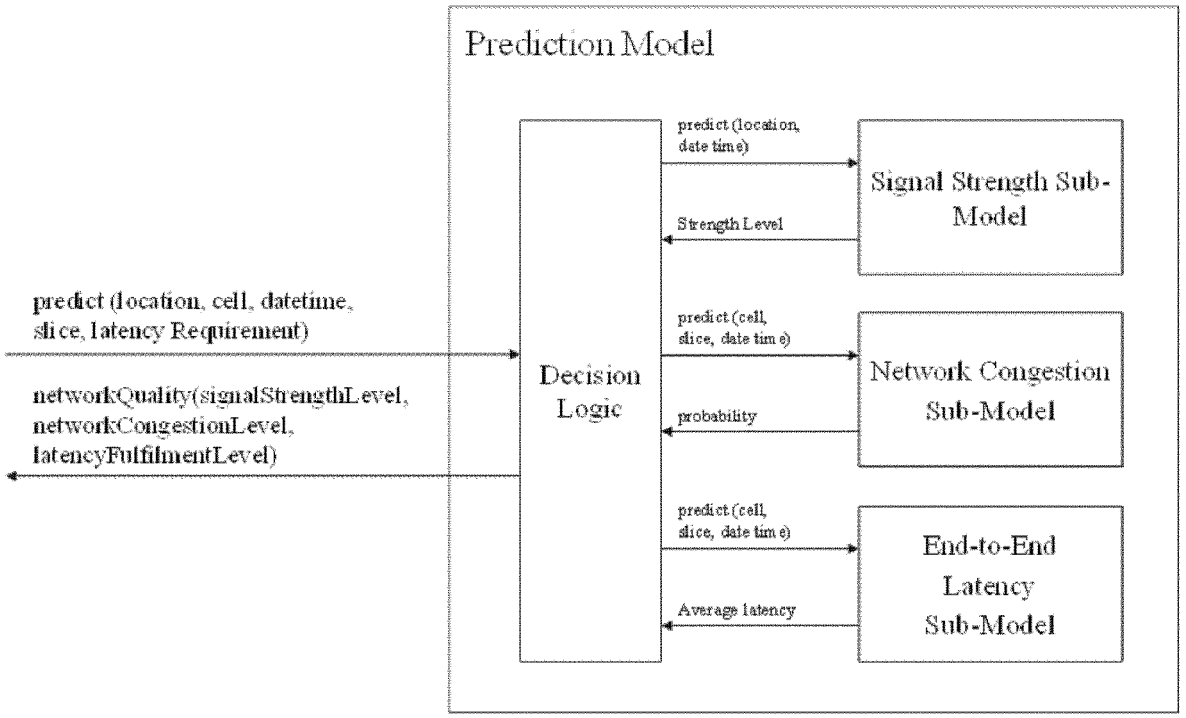
FIG. 13 shows a prediction model according to an embodiment of the present disclosure.

FIG. 13 shows a prediction model according to an embodiment of the present disclosure. The prediction model may be used to predict a poor network quality area.

The server such as the connected vehicle system may collect network status data from at least one data source. The prediction model of FIG. 13 may comprise three sub-models: Signal Strength Sub-Model, Network Congestion Sub-Model and End-to-End Latency Sub-Model.

In an embodiment, the input and output parameters of these sub models may be as following:

Signal Strength Sub-Model:
    Input: location and date time
    Output: signal strength level
  Network Congestion Sub-Model:
    Input: cellId, slice and date time
    Output: network congestion probability
  End-to-End Latency Sub-Model:
    Input: cellId, slice and date time
    Output: average latency In other embodiments, the input and output parameters of these sub models may comprise any other suitable parameters which can be used to determine the poor network quality area.

The output of each sub model may be combined in any suitable ways to determine the poor network quality area.

Figure 14:
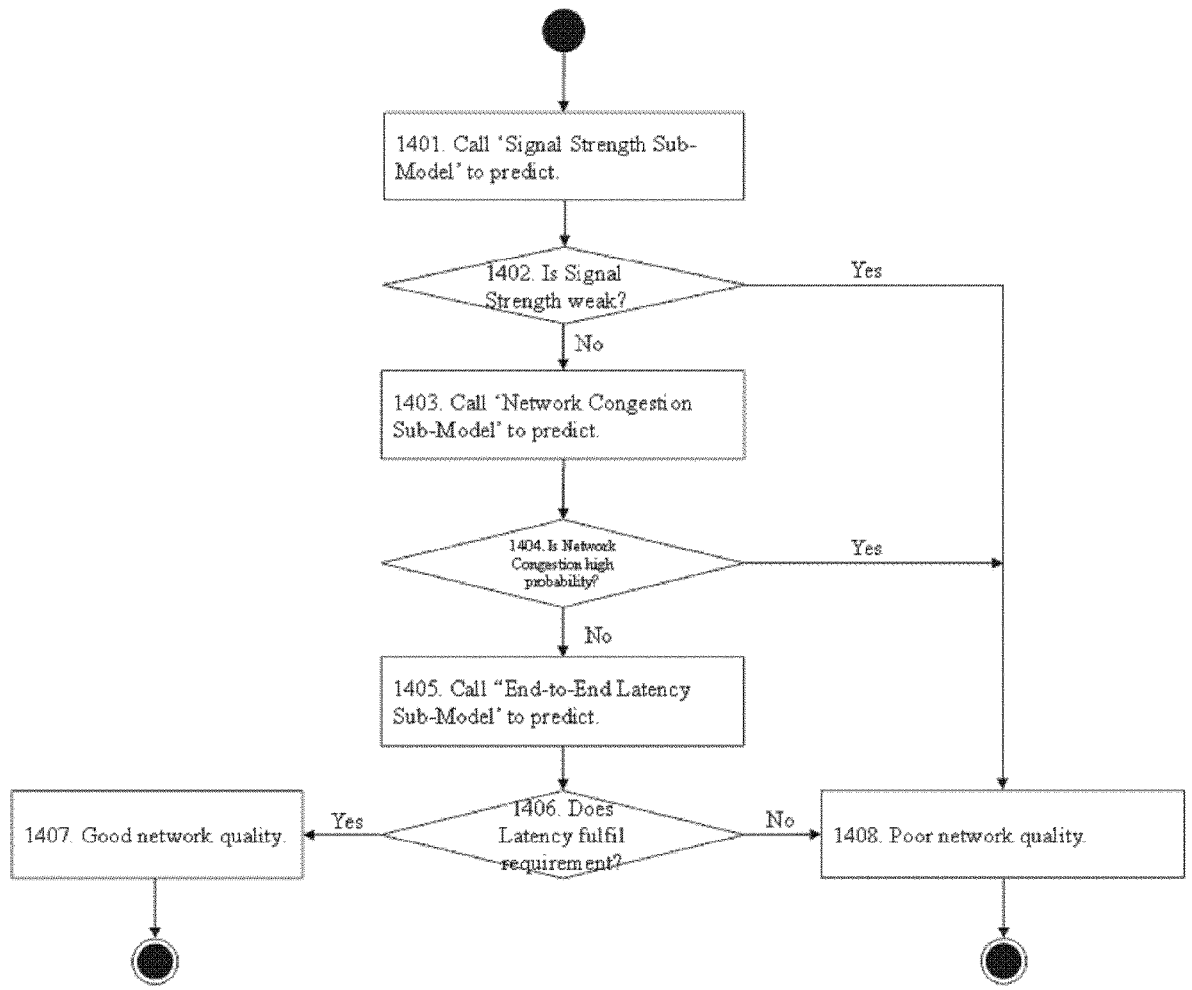
FIG. 14 shows a flowchart of a decision logic according to an embodiment of the present disclosure.

FIG. 14 shows a flowchart of a decision logic according to an embodiment of the present disclosure. The decision logic may be used in FIG. 13. The decision logic may aggregate the prediction results from the three sub-models of FIG. 13 and consider some predefined rules to determine whether a location is with a poor network quality.

The predefined rules may include, but not limited to, a signal strength threshold, a latency requirement and a threshold of network congestion probability. For example, when a signal strength of a location returned by the Signal Strength Sub-model is lower than the signal strength threshold, the location may be determined as a poor network quality area. When an average latency returned by the End-to-End Latency Sub-Model is lower than a value of the latency requirement, a location related to the average latency may be determined as a poor network quality area. When a network congestion probability returned by the Network Congestion Sub-Model is lower than the threshold of network congestion probability, a location related to the network congestion may be determined as a poor network quality area.

In an embodiment, the prediction model may implement a mechanism to translate a cell coverage area to location information and vice versa.

At block 1401, the decision logic may call a 'Signal Strength Sub-Model' to predict.

At block 1402, the decision logic may determine whether the signal strength is weak. If the signal strength is weak, then the decision logic may determine a location related to the signal strength as a poor network quality area at block 1408.

If the signal strength is not weak, then the decision logic may call "End-to-End Latency Sub-Model' to predict at block 1405.

At block 1406, the decision logic may determine whether the end-to-end latency fulfil a latency requirement. If the end-to-end latency does not fulfil the latency requirement, then the decision logic may determine a location related to the end-to-end latency as a poor network quality area at block 1408.

If the end-to-end latency fulfils the latency requirement, then the decision logic may determine a location related to the end-to-end latency as a good network quality area at block 1407.

In an embodiment, when the connected vehicle system predicts that a vehicle is approaching to a poor network quality area, the connected vehicle system may perform various options. For example, the connected vehicle system may remind a driver of a potential risk. The connected vehicle system may plan a route to bypass at least one poor network quality area for example for an automatic driving scenario.

In an embodiment, the server such as the connected vehicle system may collect network status data from at least one data source such as the network exposure function, the applications running on a server deployed at an edge of a network, and at least one terminal device and predict or determine at least one poor network quality area based on the collected network status data.

Various embodiments herein offer various advantages, of which a non-exhaustive list of examples follows. In some embodiments herein, the proposed solution may determine at least one poor network quality area based on network status data from at least one data source. In some embodiments herein, the proposed solution may be used by various services for which the determined poor network quality area may be critical. In some embodiments herein, the proposed solution may improve a driving safety in V2X. In some embodiments herein, the proposed solution may collect data (including the network status) from multiple data sources, so that a determination accuracy of poor network quality area can be improved. In some embodiments herein, the proposed solution may use various network status data (such as network slice's network status data and edge application server's network status data) to determine at least one poor network quality area. In some embodiments herein, the proposed solution may be a server-side dominated solution that may reduce a complexity of a terminal side such as vehicle side.

Figure 15:
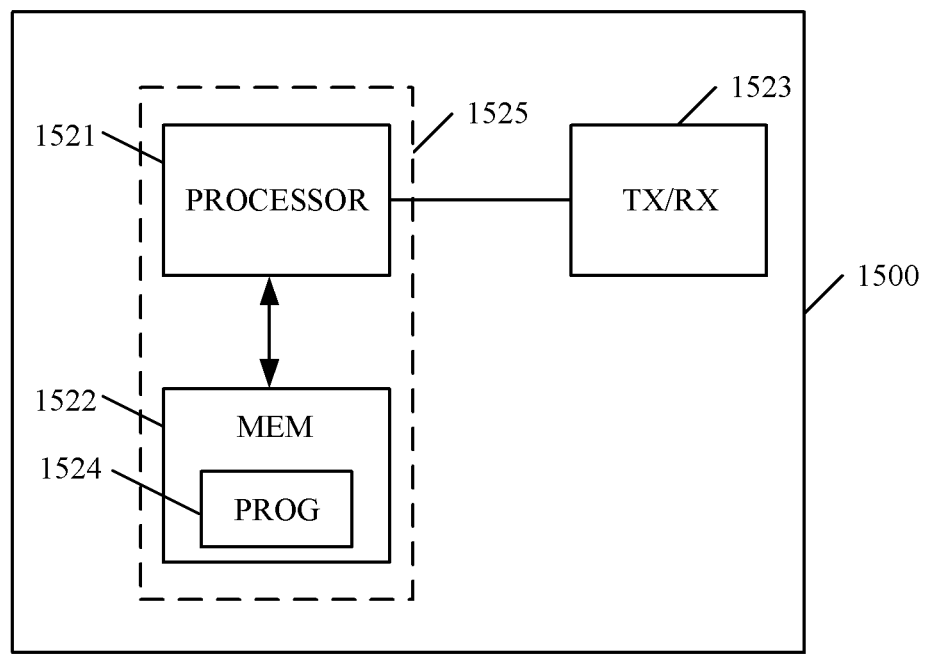
FIG. 15 is a block diagram showing an apparatus suitable for practicing some embodiments of the disclosure.

FIG. 15 is a block diagram showing an apparatus suitable for practicing some embodiments of the disclosure. For example, any one of the server and the terminal device as described above may be implemented as or through the apparatus 1500.

The apparatus 1500 comprises at least one processor 1521, such as a DP (digital processor), and at least one MEM (memory) 1522 coupled to the processor 1521. The apparatus 1520 may further comprise a transmitter (TX) and receiver (RX) 1523 coupled to the processor 1521. The MEM 1522 stores a PROG (program) 1524. The PROG 1524 may include instructions that, when executed on the associated processor 1521, enable the apparatus 1520 to operate in accordance with the embodiments of the present disclosure. A combination of the at least one processor 1521 and the at least one MEM 1522 may form processing means 1525 adapted to implement various embodiments of the present disclosure.

Various embodiments of the present disclosure may be implemented by computer program executable by one or more of the processor 1521, software, firmware, hardware or in a combination thereof.

The MEM 1522 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1521 may be of any type suitable to the local technical environment, and may include one or more of general purpose computers, special purpose computers, microprocessors, digital signal processors DSPs (digital signal processors) and processors based on multicore processor architecture, as non-limiting examples.

In an embodiment where the apparatus is implemented as or at the server, the memory 1522 contains instructions executable by the processor 1521, whereby the server operates according to any of the methods related to the server as described above.

In an embodiment where the apparatus is implemented as or at the terminal device, the memory 1522 contains instructions executable by the processor 1521, whereby the terminal device operates according to any of the methods related to the terminal device as described above.

FIG. 16 is a block diagram showing a server according to an embodiment of the disclosure. As shown, the server 1600 comprises a determining module 1601 and a first sending module 1602. The determining module 1601 may be configured to determine at least one poor network quality area based on network status data from at least one of at least one terminal device, a network device, or an application server. The first sending module 1602 may be configured to send information regarding the at least one poor network quality area to a terminal device.

In an embodiment, the server 1600 may further comprise a first receiving module 1603 configured to receive the network status data from the at least one terminal device.

In an embodiment, the server 1600 may further comprise a second receiving module 1604 configured to receive the network status data from the network device.

In an embodiment, the server 1600 may further comprise a second sending module 1605 configured to send a request for being notified of the network status data in a specific geographical area or for a specific user equipment to the network device.

In an embodiment, the server 1600 may further comprise a third sending module 1606 configured to send a request for the network status data to the application server.

In an embodiment, the server 1600 may further comprise a third receiving module 1607 configured to receive a response comprising the network status data from the application server.

In an embodiment, the server 1600 may further comprise a fourth receiving module 1608 configured to receive a request for the at least one poor network quality area from the terminal device.

In an embodiment, the server 1600 may further comprise a fifth receiving module 1609 configured to receive a request for planning a route from the terminal device.

In an embodiment, the server 1600 may further comprise a fourth sending module 1610 configured to send a response including at least one route with poor network quality area information to the terminal device.

In an embodiment, the server 1600 may further comprise a first translating module 1611 configured to translate a cell identifier to a location.

In an embodiment, the server 1600 may further comprise a second translating module 1612 configured to translate a location to a cell identifier.

Figure 17:
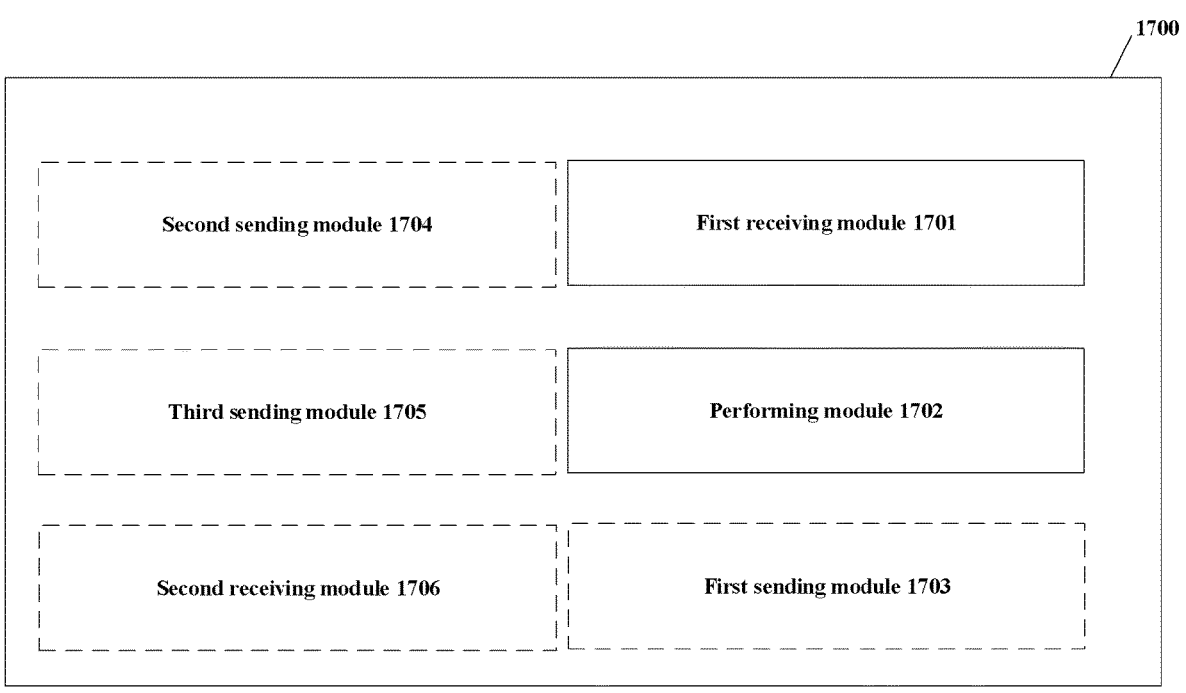
FIG. 17 is a block diagram showing a terminal device according to an embodiment of the disclosure.

FIG. 17 is a block diagram showing a terminal device according to an embodiment of the disclosure. As shown, the terminal device 1700 comprises a first receiving module 1701 and a performing module 1702. The first receiving module 1701 may be configured to receive information regarding at least one poor network quality area from a server. The performing module 1702 may be configured to perform at least one action based on the information regarding at least one poor network quality area. The at least one poor network quality area may be determined based on network status data from at least one of at least one terminal device, a network device, or an application server.

In an embodiment, the terminal device 1700 may further comprise a first sending module 1703 configured to send the network status data to the server.

In an embodiment, the terminal device 1700 may further comprise a second sending module 1704 configured to send a request for the at least one poor network quality area to the server.

In an embodiment, the terminal device 1700 may further comprise a third sending module 1705 configured to send a request for planning a route to the server.

In an embodiment, the terminal device 1700 may further comprise a second receiving module 1706 configured to receive a response includes at least one route with poor network quality area information from the server.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, any of the server and the terminal device may not need a fixed processor or memory, any computing resource and storage resource may be arranged from any of the server and the terminal device. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods related to the server and the terminal device as described above.

According to an aspect of the disclosure it is provided a computer-readable storage medium storing instructions which when executed by at least one processor, cause the at least one processor to carry out any of the methods related to the server and the terminal device as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a server, comprising:
   determining at least one poor network quality area, for cellular Vehicle-to-Everything, C-V2X, based on network status data from at least one of:

at least one terminal device, a network device, or an application server;

sending information regarding the at least one poor network quality area to a terminal device, wherein the information enables the terminal device to perform at least one action based on the information regarding the at least one poor network quality area, the at least one action comprising at least one of:

reminding a driver of a poor network quality area; or switching an automatic driving mode to a manual driving mode before the terminal device enters into a poor network quality area;

wherein the network status data comprise either:

congestion status data, cell identifier data, time data, and network slice data; or latency data, the cell identifier data, the network slice data, and the time data.

2. The method according to claim 1, further comprising:

receiving the network status data from the at least one terminal device, wherein the network status data from the at least one terminal device comprises the congestion status data, the cell identifier data, the time data, the network slice data, received signal strength data, and location data.

3. The method according to claim 1, further comprising:

receiving the network status data from the network device, wherein the network status data from the network device comprises the congestion status data, the cell identifier data, the time data, and the network slice data.

4. The method according to claim 1, further comprising:

sending a request for the network status data to the application server; and receiving a response comprising the network status data from the application server;

wherein the network status data from the application server comprises the latency data, the cell identifier data, the network slice data and the time data.

5. The method according to claim 1, further comprising:

receiving a request for the at least one poor network quality area from the terminal device;

wherein the request for the at least one poor network quality area comprises location data, the time data, latency requirement data, and the network slice data.

6. The method according to claim 1, wherein when the network status data in a network area does not fulfill a network quality requirement, the network area is determined as a poor network quality area.

7. The method according to claim 1, further comprising:

receiving a request for planning a route from the terminal device; and sending a response including at least one route with poor network quality area information to the terminal device.

8. The method according to claim 1, wherein the terminal device comprises at least one of:

a vehicle;

a drone;

a mobile phone;

a ship;

a boat;

a plane;

a helicopter;

a bike; or a motorcycle.

9. The method according to claim 1, wherein the network device is a service capability exposure function, SCEF, or a network exposure function, NEF, or a combined SCEF and NEF or a network data analytics function, NWDAF; and/or wherein the application server is an edge application server; and/or wherein the server is a vehicle server.

10. The method according to claim 1, wherein the at least one poor network quality area is related to the terminal device.

11. A method performed by a terminal device, comprising:

sending network status data from the terminal device to a server, wherein the network status data comprises either:

congestion status data, cell identifier data, time data, and network slice data; or latency data, the cell identifier data, the network slice data, and the time data;

receiving information regarding at least one poor network quality area from the server; and performing at least one action based on the information regarding the at least one poor network quality area, wherein performing the at least one action based on the information regarding the at least one poor network quality area comprises at least one of:

reminding a driver of the poor network quality area; or switching an automatic driving mode to a manual driving mode before the terminal device enters into a poor network quality area, wherein the at least one poor network quality area is determined based on the network status data from at least one of:

at least one terminal device, a network device, or an application server.

12. The method according to claim 11, wherein the network status data from the terminal device comprises the congestion status data, the cell identifier data, the time data, the network slice data, received signal strength data, and location data.

13. The method according to claim 11, further comprising:

sending a request for planning a route to the server; and receiving a response including at least one route with poor network quality area information from the server.

14. The method according to claim 11, wherein the terminal device comprises at least one of:

a vehicle;

a drone;

a mobile phone;

a ship;

a boat;

a plane;

a helicopter;

a bike; or a motorcycle.

15. The method according to claim 11, wherein the network device is a service capability exposure function, SCEF, or a network exposure function, NEF, or a combined SCEF and NEF or a network data analytics function, NWDAF; and/or wherein the application server is an edge application server; and/or wherein the server is a vehicle server.

16. The method according to claim 11, wherein the at least one poor network quality area is related to the terminal device.

17. The method according to claim 11, wherein performing at least one action based on the information regarding the at least one poor network quality area comprises at least one of:

planning a route to bypass the poor network quality area;

reminding a driver of the poor network quality area; or switching an automatic driving mode to a manual driving mode before the terminal device enters into the poor network quality area.

18. A server, comprising:

a processor; and a memory coupled to the processor, said memory containing instructions executable by said processor, whereby said server is operative to:

determine at least one poor network quality area, for cellular Vehicle-to-Everything, C-V2X, based on network status data from at least one of:

at least one terminal device, a network device, or an application server;

send information regarding the at least one poor network quality area to a terminal device, wherein the information enables a terminal device to perform at least one action based on the information regarding the at least one poor network quality area, the at least one action comprising at least one of:

reminding a driver of a poor network quality area; or switching an automatic driving mode to a manual driving mode before the terminal device enters into the poor network quality area;

wherein the network status data comprises either:

congestion status data, cell identifier data, time data, and network slice data; or latency data, the cell identifier data, the network slice data, and the time data.

19. A terminal device, comprising:

a processor; and a memory coupled to the processor, said memory containing instructions executable by said processor, whereby said terminal device is operative to:

send network status data from the terminal device to a server, wherein the network status data comprises either:

congestion status data, cell identifier data, time data, and network slice data; or latency data, the cell identifier data, the network slice data, and the time data;

receive information regarding at least one poor network quality area from a server; and perform at least one action based on the information regarding the at least one poor network quality area, wherein performing the at least one action based on the information regarding the at least one poor network quality area comprises at least one of:

reminding a driver of a poor network quality area; or switching an automatic driving mode to a manual driving mode before the terminal device enters into the poor network quality area, wherein the at least one poor network quality area is determined based on network status data from at least one of:

at least one terminal device, a network device, or an application server.

* * * * *